US009939148B2

(12) United States Patent
Halberg

(10) Patent No.: US 9,939,148 B2
(45) Date of Patent: Apr. 10, 2018

(54) PORTABLE AND RECONFIGURABLE EMERGENCY LIGHTING DEVICE

(71) Applicant: John Halberg, Vadnais Heights, MN (US)

(72) Inventor: John Halberg, Vadnais Heights, MN (US)

(*) Notice: Subject to any disclaimer, the term of this patent is extended or adjusted under 35 U.S.C. 154(b) by 0 days.

(21) Appl. No.: 15/258,851

(22) Filed: Sep. 7, 2016

(65) Prior Publication Data

US 2018/0066837 A1    Mar. 8, 2018

(51) Int. Cl.
| | |
|---|---|
| *F21V 33/00* | (2006.01) |
| *F21V 23/04* | (2006.01) |
| *F21L 4/00* | (2006.01) |
| *F21V 21/096* | (2006.01) |
| *H05B 37/02* | (2006.01) |

(52) U.S. Cl.
CPC ............ *F21V 33/0076* (2013.01); *F21L 4/00* (2013.01); *F21V 21/0965* (2013.01); *F21V 23/0414* (2013.01); *F21V 23/0471* (2013.01); *H05B 37/0281* (2013.01)

(58) Field of Classification Search
CPC ........ G08B 7/062; G08B 17/00; G08B 13/08; G08B 19/00; F21V 23/0442; F21V 19/02; F21V 23/0414; F21V 23/0471; F21V 21/0965; F21V 33/0076; F21Y 2115/10; H05B 37/0281
USPC .................................. 340/321, 593.11, 693.6
See application file for complete search history.

(56) References Cited

U.S. PATENT DOCUMENTS

| | | | | |
|---|---|---|---|---|
| 6,154,130 | A * | 11/2000 | Mondejar | G08B 13/08 340/321 |
| 6,690,288 | B1 * | 2/2004 | Waddell | G08B 7/062 340/539.11 |
| 6,859,145 | B2 * | 2/2005 | Wilker | G08B 7/066 340/539.14 |
| 9,089,016 | B2 * | 7/2015 | Recker | H02J 9/02 |
| 2011/0304268 | A1 * | 12/2011 | Bertram | F21V 3/00 315/46 |

* cited by examiner

*Primary Examiner* — Haissa Philogene
(74) *Attorney, Agent, or Firm* — Lyman Moulton, Esq.

(57) ABSTRACT

An emergency lighting apparatus comprises an elongate substrate adapted to pivot and hang from a door knob like a lever and define a handhold in a first end and support a motion sensor and a light array at a second end. The emergency lighting apparatus also includes a motion detecting lighting device comprising the motion sensor and the light array. A method is disclosed for hanging the elongate substrate on the door knob via the handhold for egress lighting and removing the elongate substrate from the door knob for use as a flashlight via the handhold.

17 Claims, 5 Drawing Sheets

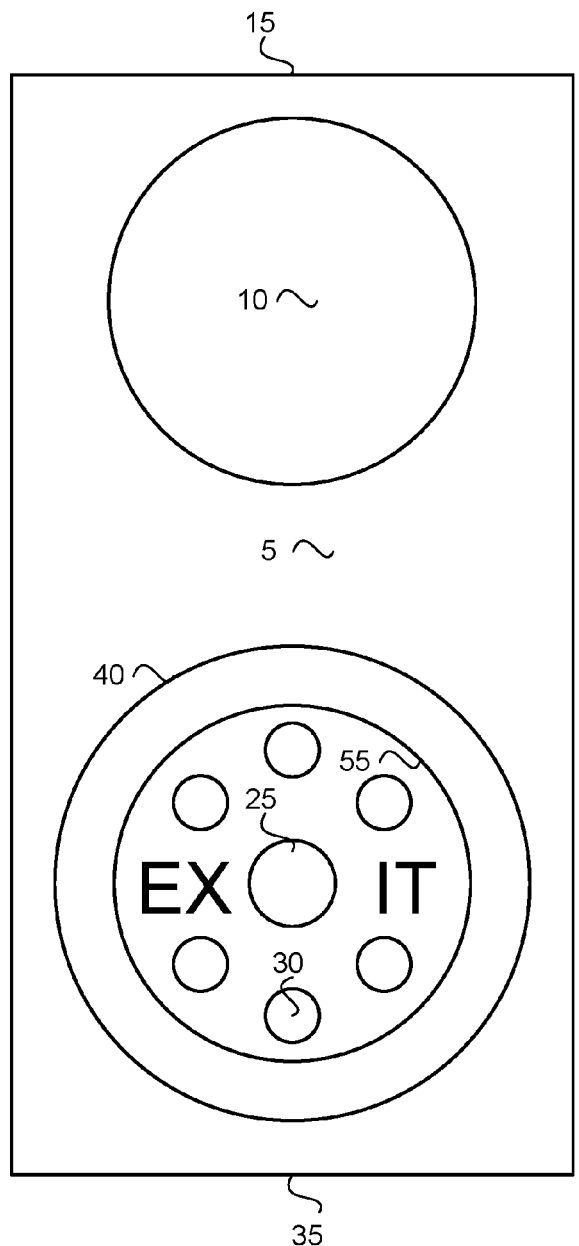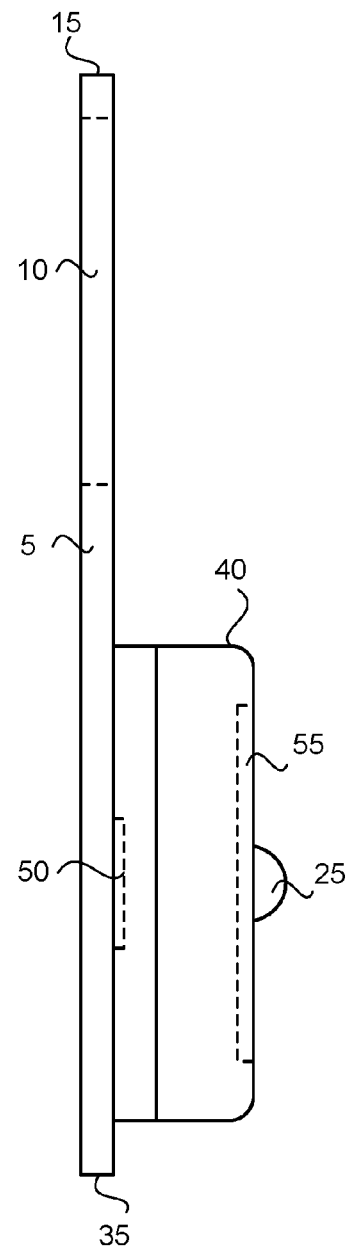
FIG. 1　　　FIG. 2

PORTABLE AND RECONFIGURABLE EMERGENCY LIGHTING DEVICE

BACKGROUND OF THE INVENTION

Conventional emergency lighting for hotels, motels, public, private and government buildings and facilities, can provide illumination despite electrical shortages in exigent circumstances. However, such lighting is also placed above doors to shine orthogonal thereto and therefore in emergency situations where dust and smoke are present may not provide emergency lighting directly on the floor where an occupant needs it the most.

Additionally, conventional emergency lighting is also permanently stationed proximal exit doors, corridors, and windows and is not designed to be portable nor designed for user input or control. Many guests in overnight facilities do not bring their own portable lighting devices. When exigent conditions arise, many guests have limited options for lighting and leaving the premises, further leading to confusion and lack of direction in extenuating circumstances.

More often than not, emergency lighting options are not even present in residences due to the extra cost and lack of affordable options either before new construction, remodel or afterwards. Therefore a long felt need for more effective and financially available emergency lighting designed for user input and control has existed in the commercial, personal and government sectors.

SUMMARY OF THE INVENTION

A disclosed emergency lighting apparatus comprises an elongate substrate adapted to pivot and hang from a door knob like a reconfigurable lever. The elongate substrate defines a handhold in a first end of the apparatus and supports a motion sensor and a light array at a second end thereof. The emergency lighting apparatus also includes a motion detecting lighting device comprising the motion sensor and the light array activated by the sensor for an active period of time, the motion detecting lighting device disposed on the elongate substrate. The emergency lighting apparatus further includes control electronics to manage the active period of time. An optional magnet disposed adjacent the second end of the elongate substrate is configured to attract the elongate substrate to the door at a reconfigurable angle less than or equal to ninety degrees orthogonal from the door. The angle, also known as a hang angle or shine angle is reconfigurable based on a distance the first end is located from the door and the second end is adjacent the door and the door knob post is located as a contact point or fulcrum point there between.

A disclosed emergency lighting method for a door comprises providing an elongate substrate adapted to pivot and hang from a door knob on the door like a lever configured to define a handhold in a first end and support a motion sensor and light array at a second end thereof. The method also includes providing a magnet disposed adjacent the second end of the elongate substrate, the magnet configured to attract the elongate substrate to the door at a shine angle less than or equal to ninety degrees orthogonal to the door. The method further includes providing an emergency lighting via an emergency lighting apparatus comprising the motion sensor and the light array activated by the sensor for an active period of time, the light array disposed at a reconfigurable shine angle to the door. The method yet includes hanging the elongate substrate on the door knob via the handhold for egress lighting and removing the elongate substrate from the door knob for use as a flashlight via the handhold Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 1 is a front elevational view of a portable emergency lighting apparatus comprising a handhold, a motion sensor and a lighting array in accordance with an embodiment of the present disclosure.

FIG. 2 is a side elevational view of the portable emergency lighting apparatus comprising a handhold, a motion sensor and a lighting array in accordance with an embodiment of the present disclosure.

Figure 3:
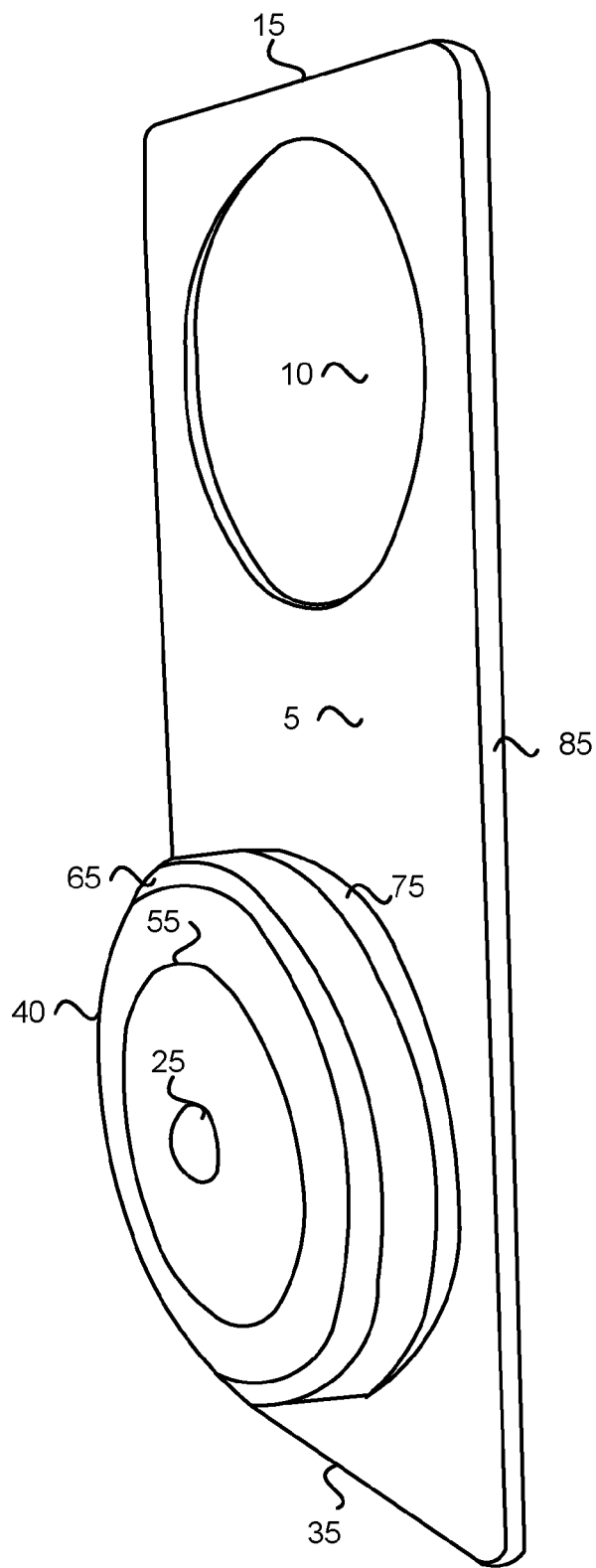
FIG. 3 is a side perspective view of the portable emergency lighting apparatus comprising a handhold, a motion sensor and a lighting array in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "lighting array" refers to multiple lights arranged in a circular pattern or a pattern of rows and columns and other patterns designed to provide higher illumination than that provided by a single light. Also throughout the present disclosure, the term "shine angle" refers to an angle at which the lighting array is directed with respect to the supporting substrate and/or supporting door. The shine angle is 'reconfigurable' in the sense that a user may set the angle and thus set the point at which the light array is aimed at the floor by setting a distance from the first end of the elongate substrate to the door. The terms 'handhold' and 'cutout' are considered synonymous in the present disclosure though the handhold may take other forms such as a radially cut aperture, etc.

FIG. 1 is a front elevational view of a portable emergency lighting apparatus comprising a handhold, a motion sensor and a lighting array in accordance with an embodiment of the present disclosure. The elongate substrate 5 is adapted to pivot and hang from a door knob like a lever. The lever like elongate substrate is configured to define a handhold 10 in a first end 15 and support a motion sensor 25 and a light array 30 at a second end 35 thereof. The emergency lighting apparatus of claim 1, wherein the handhold cutout has a nominal 6.5 cm radius to receive a bulbous door knob. The emergency lighting apparatus also includes a motion detecting lighting device 40 comprising the motion sensor 25 and the light array 30 activated by the motion sensor 25 for an active period of time, the motion detecting lighting device 40 disposed on the elongate substrate 5. The emergency lighting apparatus further includes a magnet 50 disposed proximal the second end 35 of the elongate substrate 5, the magnet 50 configured to attract the elongate substrate 5 to the door at a shine angle less than or equal to ninety degrees orthogonal from the door.

FIG. 2 is a side elevational view of the portable emergency lighting apparatus comprising a handhold, a motion sensor and a lighting array in accordance with an embodiment of the present disclosure. Same reference numbers for same or similar features may be used as those reference numbers of FIG. 1 and other figures included herein. Additionally, the lighting array lens 55 may include a colored film over laid thereon for casting a colored light from the apparatus to indicate caution, warning and danger in the event the lighting array comprises white lights. A red film covering on the light array and an 'Exit' indicia disposed thereon LED (light emitting diodes) may comprise the lighting array. The film covering allows alternate languages, cartoons and pictorials indicating egress. Though the magnet is depicted internally to the motion detecting lighting device 40, it may also be disposed directly on a backside of the elongate substrate.

FIG. 3 is a side perspective view of the portable emergency lighting apparatus comprising a handhold, a motion sensor and a lighting array in accordance with an embodiment of the present disclosure. Reference numbers illustrated in other figures may refer to the same or similar features and limitations to those illustrated in the present figure. Additionally, a chamfered edge 65, a mounting base 75 and a thickness of the substrate 85 are illustrated. The chamfered edge of the motion detecting lighting device 40 allows a greater angular range for the motion sensor 25. The mounting base 75 facilitates attaching the motion detecting lighting device 40 to the elongate substrate 5 and allows battery replacement by removing the motion detecting lighting device 40 from the mounting base 75. The mounting base 75 may be permanently attached to the elongate substrate 5 and the motion detecting lighting device may be twistingly attached thereto. The mounting base 75 may include a magnet 50 (not depicted). The substrate thickness 85 may be uniform over the elongate substrate 5 for economic manufacturing. The substrate thickness 85 may also be thicker or thinner near the handhold 10 for ergonomic factors.

Figure 4:
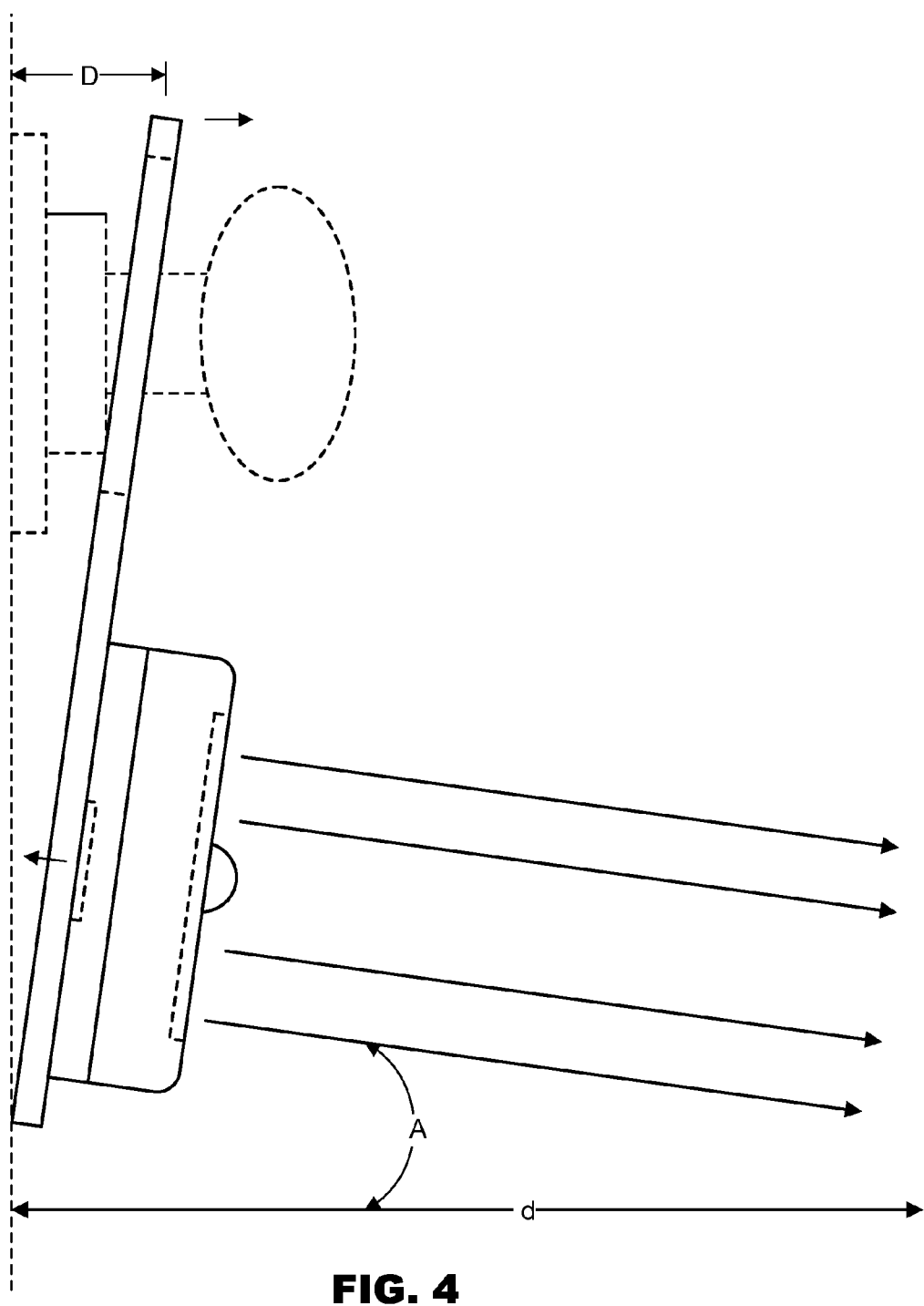
FIG. 4 is a side elevational view of the portable emergency lighting apparatus with a magnet disposed at a shine angle in accordance with an embodiment of the present disclosure.

FIG. 4 is a side elevational view of the portable emergency lighting apparatus with a magnet disposed at a shine angle in accordance with an embodiment of the present disclosure. The shine angle is configured to shine the lights on a floor adjacent the apparatus below a smoke and debris cloud distal the apparatus in an emergency environment. The elongate substrate is a hard plastic configured to have a small durometer and a uniform nominal thickness of 0.3 cm. The elongate substrate acts as a lever supporting the motion sensor, the magnet and the light array at one end and the second end on the other side of the door know post as a fulcrum. The magnet attracts the one end to the door pivoting about the door knob post fulcrum. The second end enables the apparatus to suspend or hang from the door know or door knob post. A radially cut aperture enables application to handle type door knobs. The radially cut aperture or other similar adjustable apertures may also facilitate fixing the apparatus to various size door knobs and posts. The shine angle is reconfigurable in the sense that a user may set the angle A and thus set the point at which the light array is aimed at the floor d from the door by setting a distance D from the first end of the elongate substrate to the door. The Angle A, the distance D and the floor distance d are related by trigonometry formulae.

In embodiments of the present disclosure, the motion detecting lighting device is powered autonomously via a battery power. The motion sensor comprises a multi-faceted motion detecting eye configured with a 120 degree range of motion. The motion detecting lighting device is activated by a combination of motion and darkness. This feature allows battery power to be maximized while providing emergency lighting when needed. The magnet 50 disposed proximal or adjacent the second end of the elongate substrate is designed to attract the elongate substrate to the door at a shine angle less than or equal to ninety degrees orthogonal to the door.

In another embodiment of the disclosure, a default timeout for the light array is generated when motion is not detected exceeding a pre-determinable period of time. Also, a timeout for the light array is generated when motion is not detected exceeding a programmable period of time. The user may set the default timeout and may also set the programmable period of time via mechanical dip switches and electronic gates and memory. Therefore, a user may decide that after a motion detection event, the light array may stay active for 5 minutes, 30 minutes or any arbitrary period of time. In the event no further motion is detected, the light array may shut off.

Figure 5:
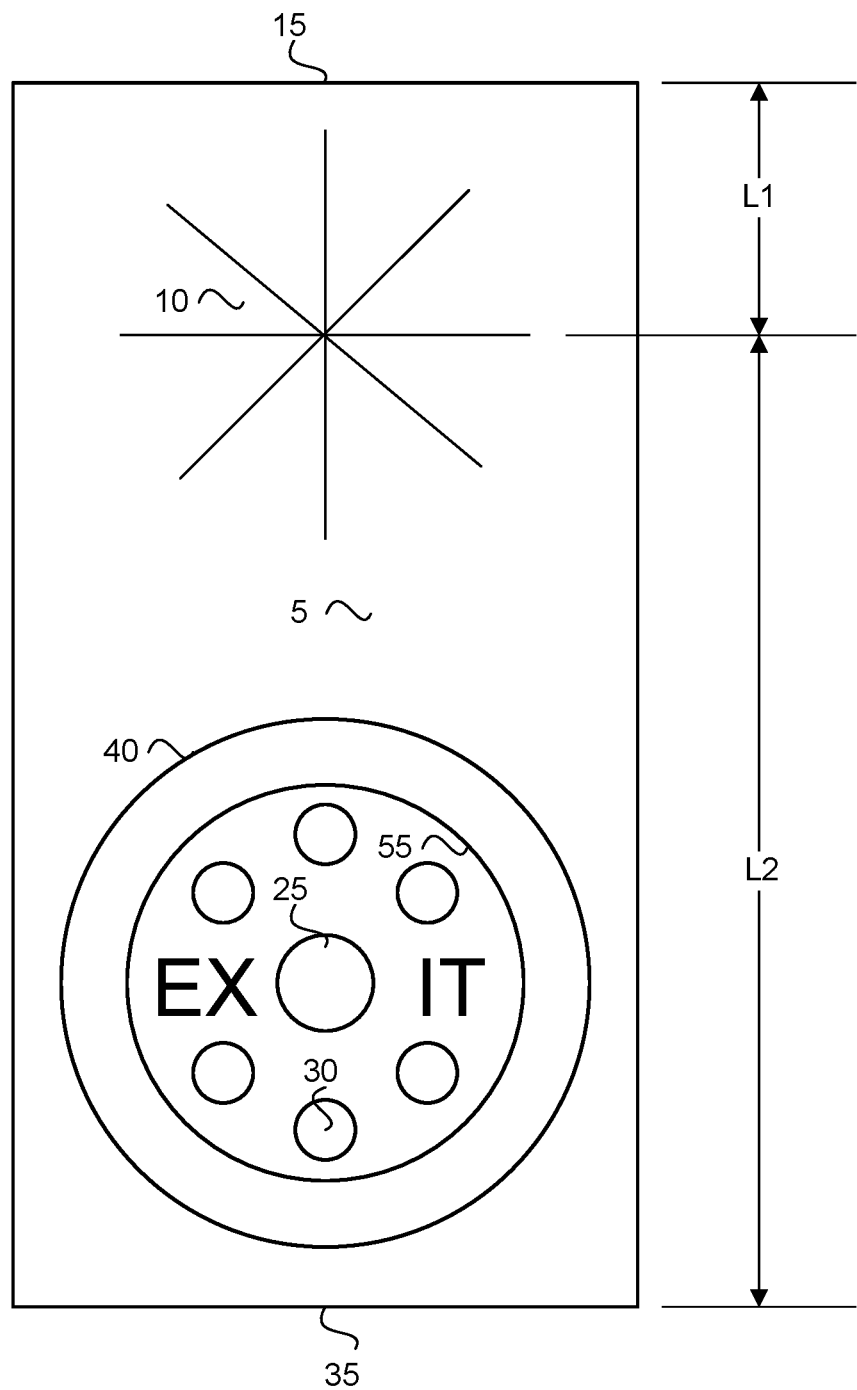
FIG. 5 is a front elevational view of the portable emergency lighting apparatus comprising a flexible substrate and a radially cut or perforated handhold in accordance with an embodiment of the present disclosure.

FIG. 5 is a front elevational view of the portable emergency lighting apparatus comprising a flexible substrate and a radially cut or perforated handhold in accordance with an embodiment of the present disclosure. The handhold may comprise a plurality of radially cut lines or perforated lines having an outside diameter less than or equal to a nominal 6.5 cm configured for hanging from a lever type door knob. A length of the elongate substrate is a nominal 20 cm and a width thereof a nominal 9 cm. A diameter of the motion detecting lighting device is a nominal 8 cm and a thickness thereof a nominal 1.5 cm excluding the motion sensor which may extend from a surface of the motion detecting lighting device by a nominal 0.3 cm. A length L1 and a length L2 also set the reconfigurable shine angle based on how far the elongate substrate is hung from the door on the door post. The shine angle approaches zero orthogonal to the door when the first end is proximal or adjacent the door and the shine angle approaches 45 degrees or more when the first end is distally located orthogonal to the door on the door knob post. This is important for smaller rooms in order to illuminate a pathway from the egress door for an occupant.

Figure 6:
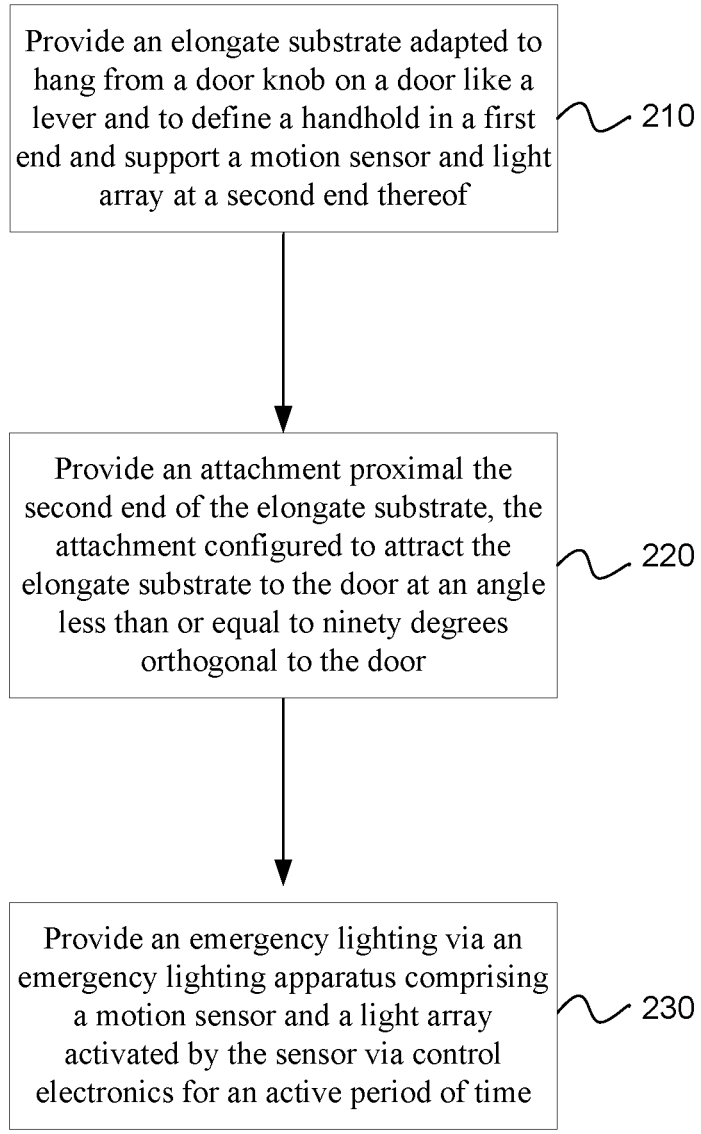
FIG. 6 is a flow diagram of a method for providing emergency lighting via the portable emergency lighting apparatus in accordance with an embodiment of the present disclosure.

FIG. 6 is a flow diagram of a method for providing emergency lighting via the portable emergency lighting apparatus in accordance with an embodiment of the present disclosure. The disclosed method includes 210 providing an elongate substrate adapted to pivot and hang from a door knob on the door like a lever configured to define a handhold in a first end and support a motion sensor and light array at a second end thereof. The method also includes 220 providing a magnet disposed adjacent the second end of the elongate substrate, the magnet configured to attract the elongate substrate to the door at a shine angle less than or equal to ninety degrees orthogonal to the door. The method further includes 230 providing an emergency lighting via an emergency lighting apparatus comprising the motion sensor and the light array activated by the sensor for an active period of time, the light array disposed at a shine angle to the door.

An embodiment of the disclosed method includes placing the handhold over the door knob and leaning the second end of the elongate substrate toward the door to enable the magnet to secure to the door. The embodiment may also include shining the light array continuously via an aperiodic activation thereof from the motion sensor based on the active period of time being greater than a no motion period of time. In other words, as long as a motion detection event occurs within the time frame of the active period, the light array does not shut off and the apparatus may be used as a flash light separated from the door knob and carried by the user.

Another embodiment of the present disclosure may include attracting the elongate substrate to the door at a shine angle less than or equal to ninety degrees orthogonal to the door. Furthermore, the disclosed method may include hanging the elongate substrate on the door knob via the handhold for egress lighting and removing the elongate substrate from the door knob for use as a flashlight via the handhold.

Therefore, the present disclosure satisfies the long felt need for a portable emergency lighting apparatus because it is small, affordable, angularly reconfigurable to avoid obstructing smoke and debris and allows a user to remove it from a door for use as an emergency flashlight.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. An emergency lighting apparatus, comprising:
   an elongate substrate adapted to pivot and hang from a door knob like a lever configured to define a handhold cutout in a first end and support a motion sensor and a light array at a second end thereof;
   a motion detecting lighting device comprising the motion sensor and the light array activated by the sensor for an active period of time, the motion detecting lighting device also comprising control electronics;
   a hang angle reconfigurable to shine the light array on a floor adjacent the apparatus below a smoke and debris cloud distal the apparatus in an emergency environment,
   wherein the hang angle is reconfigurable by adjusting a distance the first end is disposed relative to the door knob on the door.

2. The emergency lighting apparatus of claim 1, wherein the handhold cutout has a nominal 6.5 cm radius to receive a bulbous door knob.

3. The emergency lighting apparatus of claim 1, further comprising a timeout for the light array when motion is not detected exceeding a programmable period of time.

4. The emergency lighting apparatus of claim 1, wherein the elongate substrate is a hard plastic configured to have a small durometer and a uniform nominal thickness of 0.3 cm.

5. The emergency lighting apparatus of claim 1, wherein the motion detecting lighting device is powered autonomously via a battery power.

6. The emergency lighting apparatus of claim 1, wherein the motion sensor comprises a multi-faceted motion detecting eye configured with a nominal 180 degree range of motion.

7. The emergency lighting apparatus of claim 1, wherein the motion detecting lighting device is activated by a combination of motion and darkness.

8. The emergency lighting apparatus of claim 1, further comprising a default timeout for the light array when motion is not detected exceeding a pre-determinable period of time.

9. The emergency lighting apparatus of claim 1, further comprising a red film covering on the light array and an 'Exit' indicia disposed thereon.

10. An emergency lighting apparatus, comprising:
    an elongate substrate adapted to secure to a door and configured to define a handhold in a first end and support a motion sensor and a light array at a second end thereof;
    a motion detecting lighting device comprising the motion sensor and the light array activated by the sensor for an active period of time, the motion detecting lighting device also comprising control electronics; and
    a magnet disposed adjacent the second end of the elongate substrate, the magnet configured to attract the elongate substrate to the door at a reconfigurable hand angle less than or equal to ninety degrees orthogonal to the door.

11. The emergency lighting apparatus of claim 10, wherein the elongate substrate is flexible and the handhold comprises an aperture of a plurality of radially cut lines or perforated lines having an outside diameter less than or equal to a nominal 6.5 cm configured for hanging from a handle type door knob.

12. The emergency lighting apparatus of claim 10, wherein a length of the elongate substrate is a nominal 20 cm and a width thereof a nominal 9 cm.

13. An emergency lighting method for a door, comprising:
    providing an elongate substrate adapted to hang from a door knob on a door like a lever and configured to define a handhold in a first end and support a motion sensor and light array at a second end thereof;
    providing an attachment proximal the second end of the elongate substrate, the attachment configured to attract the elongate substrate to the door at an angle less than or equal to ninety degrees orthogonal to the door; and
    providing an emergency lighting via an emergency lighting apparatus comprising the motion sensor and the light array activated by the sensor for an active period of time, the emergency lighting apparatus also comprising control electronics.

14. The emergency lighting method of claim 13, further comprising shining the light array continuously via an aperiodic activation thereof from the motion sensor based on the active period of time being greater than a no motion period of time.

15. The emergency lighting method of claim 13, further comprising attracting the elongate substrate to the door at a reconfigurable hang angle less than or equal to ninety degrees orthogonal to the door, the shine angle reconfigurable according to a distance between the first end and the door knob.

16. The emergency lighting method of claim 13, further comprising hanging the elongate substrate on the door knob via the handhold for egress lighting and removing the elongate substrate from the door knob for use as a flashlight via the handhold.

17. The emergency lighting method of claim 13, further comprising placing the handhold over the door knob and leaning the second end of the elongate substrate toward the door to enable the magnet to secure to the door.

* * * * *